United States Patent [19]

Endo et al.

[11] Patent Number: 4,581,275

[45] Date of Patent: Apr. 8, 1986

[54] BASE CLOTH FOR REINFORCEMENT

[75] Inventors: Masao Endo, Nishinomiya; Katsushi Tsujii, Amagasaki; Hiromi Mishima, Nara; Masayuki Fukui, Hirakata, all of Japan

[73] Assignee: Kurashiki Boseki Kabushiki Kaisha, Japan

[21] Appl. No.: 677,129

[22] Filed: Dec. 3, 1984

[30] Foreign Application Priority Data

Dec. 1, 1983 [JP] Japan .................................. 58-227583

[51] Int. Cl.⁴ .............................................. B23K 31/02
[52] U.S. Cl. .................................... 428/113; 428/294; 428/296; 428/367; 428/377; 428/902
[58] Field of Search ............... 428/113, 294, 296, 367, 428/377, 902

[56] References Cited

U.S. PATENT DOCUMENTS 3,598,689  8/1971  Feffer ................................... 428/294
4,110,505  8/1978  Prewo .................................. 428/294
4,260,441  4/1981  Prewo .................................. 428/294

Primary Examiner—Marion C. McCamish
Attorney, Agent, or Firm—Lawrence Rosen

[57] ABSTRACT

The present invention provides a base cloth for reinforcement produced by winding a weldable yarn on either one of a warp or weft or the both at a definite interval, arranging the warp and weft in the respective directions and then thermally welding the both yarns. According to this method, the fraying of warp or weft, particularly easy fluffing of carbon fibers, etc. can be prevented by winding the weldable yarn. And, it is sufficient for the weldable yarn to be present at the intersections between the warp and weft. Consequently, as compared with a case wherein the whole weft is impregnated with adhesives, penetration of the matrix resin can sufficiently be attained and thus, strength in the weft direction can be improved.

8 Claims, 3 Drawing Figures

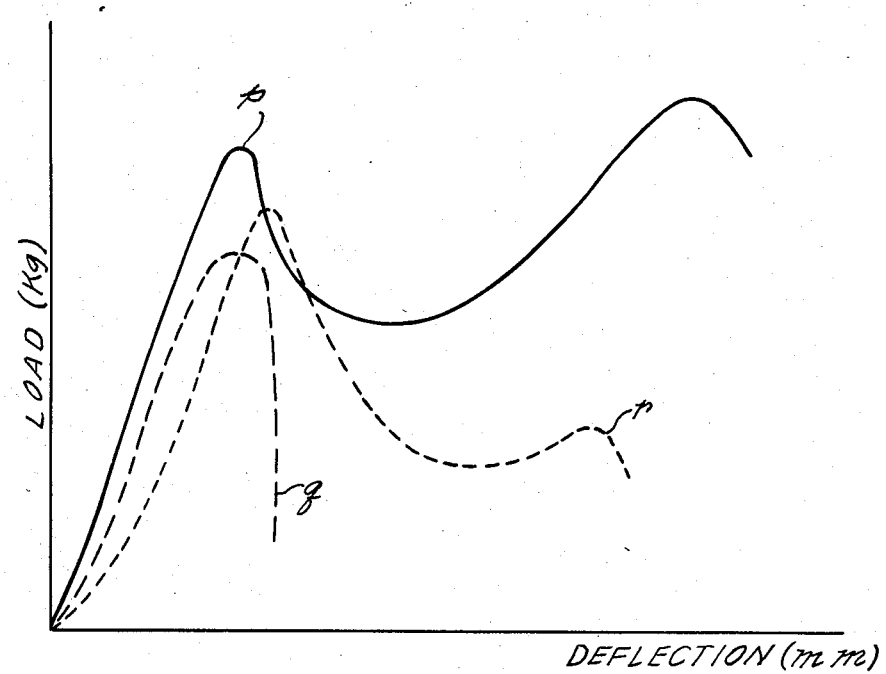

4,581,275

BASE CLOTH FOR REINFORCEMENT

BACKGROUND OF THE INVENTION

A base cloth for reinforcement is sometimes used for composite molded products such as FRP (fiber-reinforced plastic), cement, concrete, tarpaulin, etc. For example, for tennis rackets, fishing rods, etc., base cloths made of a high-strength, and high-modulus multifilament of carbon fiber, glass fiber, aromatic polyamide fiber or the like are used in a form bound with matrix resins such as epoxy resins, etc. Also, for the reinforcement of cement and concrete, alkaline-resist vinylon fibers, etc. are sometimes used as a reinforcing base cloth. Further, for the so-called tarpaulin produced by placing a reinforcing material between two layers of paper or film, a base cloth is sometimes used as the reinforcing material.

The so far known base cloths for reinforcement include for example the following: Woven fabric of reinforcing fibers; products comprising a warp impregnated with small amounts of an adhesive to prevent fraying and a weft which is a thermally weldable fiber, both yarns being adhered to each other at the intersections thereof; products obtained by adhering a warp to a weft impregnated with an adhesive; and the like.

The base cloth for reinforcement having a form of woven fabric of reinforcing fiber has defects. For example, the warps are flexed above and below wefts at weaving points, so that a force parallel to the face of the fabric is sustained at angled warps. Further, woven fabric is restricted in densities of warp and weft. Production of a woven fabric having a density larger than a specific density is difficult, because the volume of the fiber is restricted by the weaving of warp and weft, and the fabric is liable to be napped by mutual abrasion of warps. Furthermore, as carbon fibers, aromatic polyamide fibers and the like are liable to slip, the production of the fabric having a lower density than a specific density is difficult. Therefore, for keeping a giving interval of the warp, other fiber warp is necessary to be woven into the interval, which lowers the density of the carbon fibers or aromatic polyamide fibers in the woven fabric.

In the method to impregnate the warp with adhesives, penetration of matrix resin into base cloth is disturbed by the influence of the impregnating adhesive to cause a poor reinforcement strength. Also, since thermally weldable fibers are used as a weft, strength in the widthwise direction can hardly be expected.

The method to impregnate the weft with adhesives is much superior in improving the defects of the foregoing method. But, because of the weft being impregnated with adhesives, adhesion of the weft to matrix resins is poor and the reinforcement in the weft direction is not sufficient.

SUMMARY OF THE INVENTION

The present invention relates to a base cloth for reinforcement, particularly a base cloth for reinforcing composite molded products.

The present invention provides a base cloth for reinforcement produced by winding a weldable yarn on either one of a warp or weft or the both at a definite interval, arranging the warp and weft in the respective directions and then thermally welding the both yarns. According to this method, the fraying of warp or weft, particularly easy fluffing of carbon fibers, etc. can be prevented by winding the weldable yarn. And, it is sufficient for the weldable yarn to be present at the intersections between the warp and weft. Consequently, as compared with a case wherein the whole weft is impregnated with adhesives, penetration of the matrix resin can sufficiently be attained and thus, strength in the weft direction can be improved.

BRIEF DESCRIPTION OF THE DRAWING

FIG. 3 is a graph illustrating the result of the flexural test of cement.

DETAILED DESCRIPTION OF THE INVENTION

Figure 1:
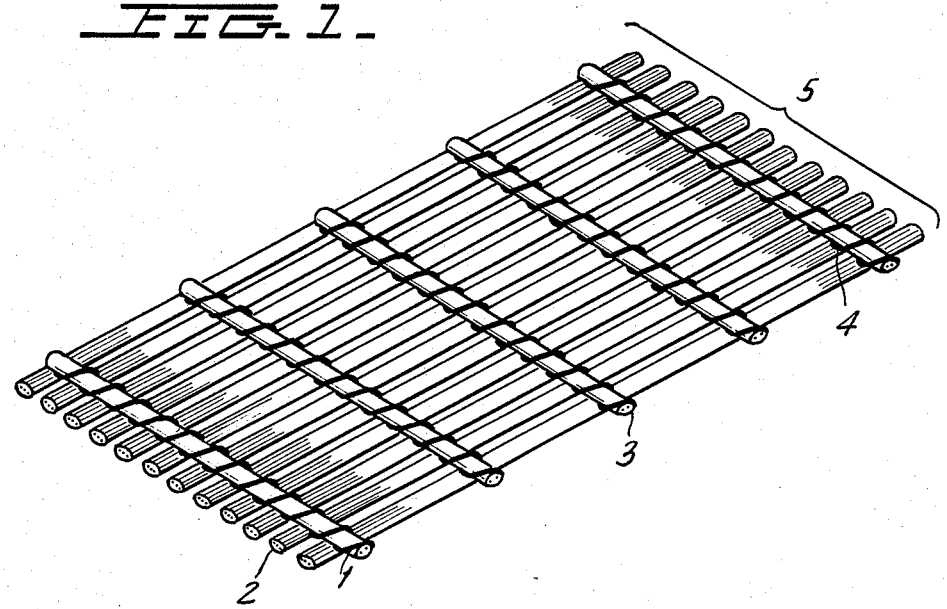
FIG. 1 is a typical view of the base cloth for reinforcement of the present invention.

The present invention relates to a base cloth for reinforcement, particularly a base cloth for reinforcing composite molded products.

The present invention provides a base cloth for reinforcement (5) which comprises winding a weldable yarn (1) on either one of a warp (2) or weft (3) or the both, placing the weft (3) on one or both of the surfaces formed by a row of the warps or the warp on both of the surfaces formed by a row of the wefts, and adhering the both yarns through the weldable yarn (1) at the intersections (4) between them.

FIG. 1 shows a state wherein a weldable yarn has been wound on a weft (3). The weldable yarn may be wound on a warp or both of a warp and a weft. In FIG. 1, a row of warps may be placed on the wefts so as to make a sandwich structure, or wefts may be places on both of the surfaces formed by a row of warps.

In the present invention, any warp (2) may be selected according to intended uses, but in order to obtain high-strength composite molded products, high-strength, and high-modulus multifilaments such as organic fibers (e.g. aromatic polyamide fiber), inorganic fibers (e.g. glass fiber, carbon fiber, graphite fiber) and the like are suitable. Of course, other fibers such as vinylon, polyester and polyamide fibers, etc. may properly be used according to the objects. These multifilaments are non-twist yarns or soft twist yarns. The degree of twist of the soft twist yarn is about 5 to about 40 times/m, preferably 10 to 20 times/m. When the twist is hard, sheet strength lowers or impregnation of matrix resins becomes insufficient, so that there occurs a case wherein the strength of molded composites is not sufficient. A suitable yarn count of the warp is about 300 to about 30000 denier. For base cloths for reinforcing cement, concrete, etc., it is preferred to use alkali-resistant vinylon fibers and aromatic polyamide fiber, etc. Also, for tarpaulin requiring electroconductivity, carbon fibers may be used.

The fiber constituting the weft (3) may be the same as or different from that constituting the warp. It suffices for the weft to use polyamide fibers, polyester fibers, etc. having a higher melting point than that of the weldable yarn in addition to organic fibers such as carbon fibers, graphite fibers, aromatic polyamide fibers, polyvinyl alcohol fibers, etc. and inorganic fibers such as glass fibers, etc. A suitable yarn count of these wefts is 100 to 30000 denier. The weft is non-twist yarns or soft twist yarns. The number of twists of soft twist yarns is preferably not more than 20 times/m, more preferably 10 times/m. When the number of twists is large, the section of weft becomes difficult to be flat, there is a danger of damaging the warp, and besides adhesion to the warp becomes poor.

As to the method to combine the weldable yarn with the reinforcing yarn, such a method as the weldable yarn is wound over the reinforcing yarn is preferable.

The normally twisted yarn of the weldable yarn with the reinforcing yarn is not preferred because the linearity of the reinforcing fiber is disturbed and consequently the strength of the composite decreases. For the weldable yarn, thermoplastic fiber having a property to weld the warp to the weft are used. A preferred weldable yarn includes polyethylene fibers, polypropylene fibers, polyvinyl chloride fibers, polyvinylidene chloride fibers, polyethylene/vinyl acetate fibers, copolymeric nylon fibers, conjugated fibers of these fibers, polyester copolymer fibers and the like. These fibers need to be lower in melting point than the warp or weft on which they are wound. The apparent width of the weldable yarn on the core yarn is not more than 2 mm, preferably 1.5 mm to 0.5 mm. When the width is more than 2 mm, contact area between the weldable yarn and the warp or weft is so large that it becomes difficult for the matrix resin to penetrate into the whole core yarn. The yarn count and the number of windings of the weldable yarn are properly selected according to the yarn count of the warp or weft to which the weft or warp wound with the weldable yarn is to be adhered, and the interval of arrangement of the warp or weft. In principle, the yarn count and the number of windings are selected so that the weldable yarn is present at intersections between the warp and weft, as shown in FIG. 1. Of course, there is no necessity for the warp and weft to adhere to each other at every intersection, but it suffices for the warp and weft to be capable of maintaining the relation of warp to weft. For example, no adhesion between the warp and weft at continuous two to three intersections may be allowed. Also, when the weldable yarn is wound on both the warp and weft, it becomes possible to decrease the number of windings on each yarn. Further, by arranging the warp and weft at an angle to each other, base cloths for reinforcement having the both yarns intersected obliquely can be obtained.

Figure 2:
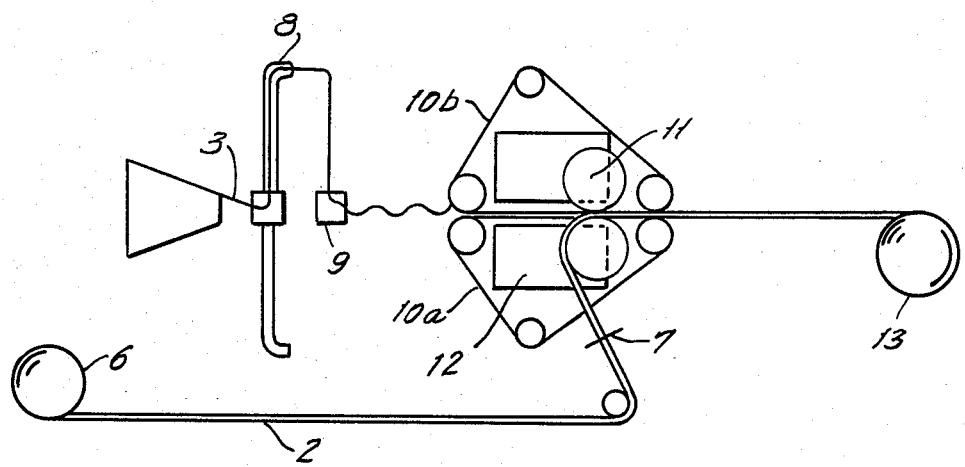
FIG. 2 is a schematic view of an equipment for producing said base cloth.

The present invention will be illustrated with reference to the following examples and FIG. 2. FIG. 2 is a schematic view of an equipment for producing the base cloth for reinforcement of the present invention.

EXAMPLE 1

Glass roving (1150 tex) was used as the warp (2). 250 warps are pulled downward out of a creel stand (6) and passed through a warping means (7) to arrange into a width of 100 cm at a rate of 2.5 warps/cm. As the weft (3) were used twist yarns produced as follows: A glass fiber strand (600 d; number of twists, 20 times/m) was wound with a thermo-weldable yarn of copolymeric nylon (100 d; 12 F; melting point, 125° C.) at varying numbers of windings of 100, 200, 400, 800, 1200 and 1600 times/m. The weft is wound on a support member (9) through a rotating arm (8) and carried forward by rotation of the support member (9) to form a sheet of parallel wefts arranged at a rate of 5 wefts/cm. In the vicinity of the end part of the support member (9), this sheet is held between endless belts (10a and 10b) and further carried forward therebetween. The thermo-weldable yarn heated to a molten state in a heating furnace (12) and is led to a heating press roll (11).

The warp and weft are welded to each other on the heating press roll (11) for adhering the both yarns, detached from the belts (10a and 10b) and after cutting off the extra, wound on a take-up roll (13).

Using the base cloth obtained in Example 1 and a matrix resin liquid produced by blending 100 parts of a commercial unsaturated polyester resin (Polylight FH 123; produced by Dainippon Ink Co.) and 1.0 parts of a curing catalyst (Permec H; produced by Nippon Yushi Co.), a laminated plate was formed, dried and cured by the hand lay up method.

This laminated plate was measured for the physical properties in the weft direction. The result is shown in Table 1. Also, the weldability between warp and weft of the base cloth and the arrangement state of the wefts were observed. The result is shown in Table 1.

The base cloth was made using as the warp glass roving comprising a bundle of strands (each strand, 2.9 to 3.9 mm in width) and the weft wound with a thermo-weldable yarn of 0.4 mm in width.

In Comparative example, a polyolefin emulsion (solid content, 35%) was used as an adhesive, and it was impregnated to glass fiber, a weft, at a rate of 30%, as converted to dry polyolefin basis, based on the weight of the glass fiber.

When the number of windings is 400 to 800 times/m, the physical property and adhesion are superior, but at the number of windings of less than 200 times/m, the adhesion decreases and the arrangement of weft begins to fall into disorder, and the physical property decrease.

At a number of windings of more than 1200 times/m, penetration of the matrix resin into the weft strands becomes poor, and with the increasing number of windings, the physical properties gradually lower.

In Comparative example wherein the whole weft is impregnated the adhesive, the physical property becomes extremely poor, showing no large fiber reinforcing effect.

TABLE 1

| | Physical property of laminated plate (in the weft direction) | | | | | | |
|---|---|---|---|---|---|---|---|
| | 1 | 2 | 3 | 4 | 5 | 6 | Comparative example |
| Number of windings (per m) | 100 | 200 | 400 | 800 | 1200 | 1600 | Adhesive |
| Tensile strength (kg/mm$^2$) | 4.4 | 5.0 | 6.8 | 7.5 | 5.5 | 5.0 | 4.1 |
| Tensile modulus (kg/mm$^2$) | 920 | 950 | 1010 | 1020 | 980 | 940 | 850 |
| Flexural strength (kg/mm$^2$) | 5.1 | 5.8 | 8.4 | 9.1 | 8.1 | 5.9 | 3.9 |
| Flexural modulus (kg/mm$^2$) | 760 | 810 | 840 | 860 | 820 | 790 | 700 |
| Compressive strength (kg/mm$^2$) | 10.2 | 10.8 | 11.8 | 12.1 | 11.0 | 10.7 | 9.2 |
| Compressive modulus (kg/mm$^2$) | 790 | 860 | 1120 | 1200 | 920 | 850 | 600 |
| Adhesion betweem warp and weft | C-D | C | A | A | A | A | A |
| Arrangement | C-D | C | A | A | A | A | A |

TABLE 1-continued

Physical property of laminated plate
(in the weft direction)

|  | 1 | 2 | 3 | 4 | 5 | 6 | Comparative example |
|---|---|---|---|---|---|---|---|
| state of weft |  |  |  |  |  |  |  |

A: The warp and weft are adhered to each other at every intersection, there being no disorder of arrangement.
B: The warp and weft are in part out of position, being a partial disorder in the arrangement of the weft.
C: Adhesion between the warp and weft is insufficient, disorder being observed in the arrangement of the weft.
D: The warp and weft are out of position, disorder being observed in the arrangement of both the warp and weft.

EXAMPLE 2

A carbon fiber strand (3600 d; number of twists, 15 times/m) was used as the warp (2), and it was arranged at a rate of 5 ends/cm by the same means as in Example 1. The weft was prepared as follows: A carbon fiber strand (3600 d; number of twists, 15 times/m), a core yarn, was wound with a polyethylene/polypropylene conjugated multifilament strand (100 d, 44 F) at varying numbers of windings of 100, 200, 400, 800 and 1200 times/m. The weft was arranged at a rate of 3.7 ends/cm into a sheet by the same means as in Example 1. The warp and the weft sheet were adhered to each other and wound up to prepare a base cloth in the same manner as in Example 1.

On observing the warp and weft of the base cloth thus obtained, it was found that the width of the warp was 1.4 to 1.6 mm and the apparent width of the weldable yarn of the weft was 0.8 to 0.85 mm.

Using this base cloth, a fiber-reinforced laminated plate was prepared in the same manner as in Example 1, and the physical property in the weft direction was measured. The result is shown in Table 2.

The physical property and adhesion are good when the number of twists is in the range of 200/m to 800/m, but in the range of less than 200 times/m, reduction in both the adhesiveness and physical property is noticed. While at more than 1200 times/m, the physical property decreases in the same manner as in Example 1.

In Comparative example wherein an adhesive, a polyolefin emulsion, was impregnated to the weft at a rate of 30%, as converted to dry basis, based on the weight of the weft, the physical property of the base cloth proves to be poor.

TABLE 2

Physical property of laminated plate
(in the weft direction)

|  | 7 | 8 | 9 | 10 | 11 | Comparative example |
|---|---|---|---|---|---|---|
| Number of windings (per m) | 100 | 200 | 400 | 800 | 1200 | Adhesive |
| Tensile strength (kg/mm$^2$) | 18.2 | 27 | 39.0 | 38.2 | 20 | 12.0 |
| Tensile Modulus (kg/mm$^2$) | 1530 | 1540 | 3410 | 3310 | 1250 | 1020 |
| Compressive strength (kg/mm$^2$) | 17.0 | 21.0 | 34 | 32 | 15.0 | 11.9 |
| Compressive modulus (kg/mm$^2$) | 2040 | 2600 | 4030 | 3950 | 1760 | 1250 |
| Adhesion between warp and weft | C | B-A | A | A | A | A |
| Arrangement state of weft | C | B-A | A | A | A | A |

In the table, A, B, C and D have the same meanings as in Table 1.

EXAMPLE 3

Preparation of base cloth

Vinylon multifilament (1800 d; Kralon 182 EE produced by Kuraray Co.) was used as the warp (2). 200 warps were pulled downward out of a creel stand (6) and passed through a warping means (7) to arrange into a width of 100 cm at a rate of 2.0 warps/cm. As the weft (3) were used wonded yarns produced as follows: A vinylon multifilament (1800 d; Kralon V-5508 produced by Kuraray Co.), a core yarn, was wound 660 times/m with a weldable yarn of vinylidene chloride multifilament (33 d×6 F). The weft is wound on a support member (9) through a rotating arm (8) and carried forward by rotation of the support member (9) to form a sheet of parallel wefts arranged at a rate of 2 wefts/cm. In the vicinity of the end part of the support member (9), this sheet is held between endless belts (10a and 10b) and further carried forward therebetween. The thermoweldable yarn reaches a molten state in a heating furnace (12) and is led to a heating press roll (11).

The warp and weft are welded to each other on the heating press roll (11) for adhering the both yarns, detached from the belts (10a and 10b) and after cutting off the extra, wound on a take-up roll (13).

Preparation of reinforced cement

A cement composition was prepared by the following recipe:

| Recipe | Part by weight |
|---|---|
| Portland cement | 1 |
| Perlite (Perlite C*$^1$) | 0.5 |
| Water | 1 |
| Water-reducing agent (Mighty 150*$^2$) | 0.01 |

*$^1$Produced by Mitsui Mining & Mining & Smelting Co. Ltd.
*$^2$Produced by Kao Soap Co., Ltd.

The above cement composition was placed to a level of 12 mm in a mold frame [internal dimension: 15 mm×200 mm×15 mm (high)], the base cloth previously prepared was placed on the cement so that the direction of the warp run parallel with the longitudinal direction of the mold frame and then the cement composition was further poured into the frame to the full condition.

The cement molded product was cured in water at room temperature for four weeks, and applied to the flexural test and impact test.

Flexural test

The test was carried out according to JIS A-1408-1977 (No. 5 test sample) so that tension was applied to the reinforcing base cloth-containing side. The result of the flexural test is shown in FIG. 3 (p). Based on this result, initial crack flexural strength and secondary flexural strength were obtained. The result is shown in Table 3.

Impact test

The test was carried out according to JIS K-7111-1977, provided that the dimension of a test sample was made 100 mm×15 mm×15 mm. The result is shown in Table 3.

COMPARATIVE EXAMPLE

A cement molded product containing no base cloth (blank) and that containing a base cloth, as prepared with an adhesive-impregnated fiber, were prepared in the same manner as in Example 3. The flexural test (initial crack flexural strength and secondary flexural strength) and impact test were carried out in the same manner as in Example 3. The result is shown in FIG. 3 and Table 3. In FIG. 3, a curve (q) shows the flexural strength of the blank, and a curve (r) shows that of the cement molded product containing the base cloth prepared with the adhesive-impregnated fiber.

The base cloth prepared with the adhesive-impregnated fiber was made as follows: The warp and the core yarn (vinylon multifilament, 1800 d) of the weft used in Example 3 was adhered with a polyacrylic ester emulsion of 18.5% by weight, as converted to dry basis, to make a net.

TABLE 3

|  |  | Example 3 | Comparative Example | |
|---|---|---|---|---|
|  |  |  | Blank | Base cloth prepared with adhesive-impregnated fiber |
| Structure of base cloth (number of yarn/cm) | Warp | 2 | 0 | 2 |
|  | Weft | 2 | 0 | 2 |
| Physical property | Specific gravity (g/cm$^3$) | 1.1 | 1.0 | 1.1 |
|  | Fiber content (wt. %) | 0.24 | 0 | 0.24 |
|  | Initial crack flexural strength (kg/cm$^2$) | 24.7 | 17.7 | 19.5 |
|  | Secondary flexural strength (kg/cm$^2$) | 33.9 | (-0-) | (11.6) |
|  | Impact strength (kg-cm/cm$^2$) | 15.2 | 0.8 | 7.4 |

From Table 3, it can be seen that the base cloth prepared with the adhesive-impregnated fibers is insufficient in cement reinforcing effect as compared with the base cloth of the present invention. The reason for this may be considered as follows: Cement does not penetrate into the base cloth prepared with the adhesive-impregnated fibers, showing no compatibility with the base cloth.

What is claimed is:

1. A base cloth for reinforcement which comprises a warp and a weft each comprising a set for parallel yarns running in the machine direction and cross-machine direction, respectively, the weft being on at least one of the surfaces formed by the warp, and a thermoplastic weldable yarn weldable to both the warp and the weft and having a lower melting point than that of the warp and weft, the weldable yarn wound on at least one of the warp and weft and adhering the warp and the weft at a plurality of intersections therebetween.

2. A base cloth as described in claim 1, wherein the apparent width of the weldable yarn on the core yarn is not more than 2 mm.

3. A base cloth as described in claim 2, wherein the warp and weft are a non-twist or soft twist yarn of multifilaments.

4. A base cloth as described in claim 2, wherein the warp and weft are a high-strength and high-modulus multifilament.

5. A base cloth as described in claim 4, wherein the multifilament is carbon fiber, graphite fiber, aromatic polyamide fiber or glass fiber.

6. A base cloth as described in claim 2, wherein the weldable yarn is polyethylene yarn, polypropylene yarn, nylon copolymer yarn, polyvinyl chloride yarn, polyvinylidene chloride yarn, polyethylene/vinyl acetate yarn or conjugated yarns thereof.

7. A base cloth as described in claim 1, wherein the number of windings of the weldable yarn is selected such that the weldable yarn is substantially present at all intersections between the warp and weft.

8. A base cloth as described in claim 1 intended for composite molded products.

* * * * *